(12) United States Patent
Andersson et al.

(10) Patent No.: US 8,468,806 B2
(45) Date of Patent: Jun. 25, 2013

(54) METHOD FOR OPERATING AN EXHAUST AFTERTREATMENT SYSTEM AND EXHAUST AFTERTREATMENT SYSTEM

(75) Inventors: Lennart Andersson, Varberg (SE); Jonas Edvardsson, Mölndal (SE); Jonas Jansson, Göteborg (SE); Carl-Johan Karlsson, Göteborg (SE); Lucas Megas, Göteborg (SE); Anders Tuomivaara, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 414 days.

(21) Appl. No.: 12/528,092

(22) PCT Filed: Feb. 21, 2008

(86) PCT No.: PCT/SE2008/000149
§ 371 (c)(1),
(2), (4) Date: Feb. 2, 2010

(87) PCT Pub. No.: WO2008/103112
PCT Pub. Date: Aug. 28, 2008

(65) Prior Publication Data
US 2010/0139250 A1    Jun. 10, 2010

(30) Foreign Application Priority Data
Feb. 21, 2007    (SE) ...................................... 0700438

(51) Int. Cl.
*F01N 3/20*    (2006.01)
(52) U.S. Cl.
USPC .............................................. 60/288; 60/301
(58) Field of Classification Search
USPC ............................ 60/285, 297, 301, 287, 288
See application file for complete search history.

(56) References Cited

U.S. PATENT DOCUMENTS

2003/0200745 A1    10/2003    Van Nieuwstadt et al.
2004/0040289 A1    3/2004    Mazur et al.
(Continued)

FOREIGN PATENT DOCUMENTS

AT    501066 A2 *    6/2006
DE    102005035555 A1    2/2007
(Continued)

OTHER PUBLICATIONS

International Search Report for corresponding International Application PCT/SE2008/000149.
European Search Report for corresponding European Application EP 08 71 2736.

*Primary Examiner* — Thomas Denion
*Assistant Examiner* — Jonathan Matthias
(74) *Attorney, Agent, or Firm* — WRB-IP LLP

(57) ABSTRACT

A system and a method are provided for operating an exhaust aftertreatment system of an engine in which one or more constituents of the exhaust gas are oxidized in an oxidation catalyst and one or more constituents of the exhaust gas are deoxidized by means of a group of possible chemical reactions of different type between the one or more constituents of the exhaust gas and catalytic material arranged in a selective-catalytic-reduction catalyst, wherein the exhaust gas flows from the oxidation catalyst to the selective-catalytic-reduction catalyst, wherein the steps are performed: (a) adjusting at least one desired ratio among one or more pairs of the one or more constituents by varying a space velocity of the exhaust gas in at least the oxidation catalyst; (b) varying the space velocity of the exhaust gas by varying one or more operation parameters of the engine; and (c) establishing the ratio to a value at least approaching the desired ratio among the one or more pairs of the one or more constituents at the inlet of the selective-catalytic-reduction catalyst.

17 Claims, 3 Drawing Sheets

U.S. PATENT DOCUMENTS

| | | |
|---|---|---|
| 2005/0196333 A1 | 9/2005 | Schafer-Sindlinger et al. |
| 2007/0089406 A1 | 4/2007 | Doring |
| 2007/0245714 A1 * | 10/2007 | Frazier et al. .................. 60/276 |
| 2008/0010975 A1 | 1/2008 | Zhang et al. |
| 2008/0041052 A1 | 2/2008 | Doring et al. |
| 2010/0107610 A1 * | 5/2010 | Schussler et al. ............... 60/287 |

FOREIGN PATENT DOCUMENTS

| | | |
|---|---|---|
| EP | 1217196 A2 | 6/2002 |
| EP | 1435441 A2 | 7/2004 |
| WO | 9939809 A1 | 8/1999 |

\* cited by examiner

METHOD FOR OPERATING AN EXHAUST AFTERTREATMENT SYSTEM AND EXHAUST AFTERTREATMENT SYSTEM

BACKGROUND AND SUMMARY

The invention relates to a method for operating an exhaust aftertreatment system and an exhaust aftertreatment system.

Both carbon particulates and nitrogen oxides such as NO and NO2, also referred to as NOx, are typical emissions in the exhaust gas of diesel engines. Requirements for reducing such emissions increase, and trigger various approaches in the art to reduce emissions. In the European patent EP 1 054 722 B1 an exhaust aftertreatment system is disclosed which combines a particulate filter collecting soot and nitrogen oxides reducing catalysts in the exhaust tract. For removing soot NO2 is generated by oxidation of NO in an oxidation catalyst. Soot which is collected in a particulate filter is oxidized by NO2. Residual amounts of NO and NO2 in the exhaust gas are reduced to nitrogen gas in a selective-catalytic-reduction catalyst (SCR catalyst) by injecting ammonia into the SCR catalyst. The ratio of NO2 and NO in the exhaust gas is adjusted by using an appropriate oxidation catalyst for a particular SCR catalyst. For instance, Pt/A12O3 oxidation catalysts with different Pt contents produce different NO2/NO ratios. For a metal/zeolite SCR catalyst all NO should be oxidized to NO2, and for a rare-earth-based SCR catalyst a high NO2/NO ratio is desirable, whereas for transition-metal-based SCR catalysts gas mixtures of NO2 and NO are preferred instead of pure or mainly NO2 or NO gases.

The design of the oxidation catalyst usually has to be a compromise between an optimal passive burning of soot in the particulate filter and an optimal conversion of NO and NO2 in the SCR catalyst. For instance, at certain engine loads only an insufficient amount of NO is oxidized to NO2 resulting in that the particulate filter will be filled with soot and that the SCR catalyst's efficiency is low due to a surplus of NO. At other engine loads the NO2 formation in the oxidation catalyst will be too high resulting in a NO2 surplus into the SCR unit resulting in NO2 and N2O emissions. The exhaust gas composition varies strongly at different engine loads. The concurring processes described above yield only a narrow range of satisfying simultaneous soot oxidation and NOx conversion with respect to engine load and the resulting varying amounts of different kinds of constituents in the exhaust gas.

It is desirable to provide an improved method for operating an exhaust aftertreatment system for a wider range of engine loads and exhaust gas compositions. It is desirable to provide an improved exhaust aftertreatment system which can handle the exhaust gas produced during a wide range of engine loads and exhaust gas compositions.

According to a first aspect of the invention, a method is proposed for operating an exhaust aftertreatment system of an engine, particularly a diesel engine, in which one or more constituents of the exhaust gas are oxidized in an oxidation catalyst and one or more constituents of the exhaust gas are deoxidized by means of a group of possible chemical reactions of different type between the one or more constituents of the exhaust gas and catalytic material arranged in a selective-catalytic-reduction catalyst, wherein the exhaust gas flows from the oxidation catalyst to the selective-catalytic-reduction (SCR) catalyst. The oxidation catalyst can be a separate device or can be part of a diesel particulate filter. According to the invention at least one desired ratio among one or more pairs of the one or more constituents is adjusted by varying a space velocity of the exhaust gas in at least the oxidation catalyst; the space velocity of the exhaust gas is varied by varying one or more operation parameters of the engine; and the ratio is established to a value at least approaching the desired ratio among the one or more pairs of the one or more constituents at the inlet of the selective-catalytic-reduction catalyst.

Favourably, it is possible in many load conditions of the engine to provide an exhaust gas mixture to the SCR catalyst which allows an efficient and fast removal of nitrogen oxides out of the exhaust gas, while NO2 is produced to oxidize soot trapped in a particulate filter in the exhaust gas line.

Generally, the space velocity in a chemical reactor design represents the relation between a volumetric flow of a feed and a reactor volume. The space velocity indicates how many reactor volumes of feed can be treated in a unit time. It is possible to change the exhaust gas flow by changing the air intake flow of the air which the engine takes in.

If the desired ratio among the constituents can be established in the exhaust gas, it can be tried to establish the ratio among the constituents so that at a given reaction temperature in the SCR catalyst one specific chemical reaction is selected out of a group of possible chemical reactions which can take place among the constituents of the exhaust and the catalyst material in the SCR catalyst, wherein the selected specific chemical reaction has a higher probability to be performed than each single one of the other chemical reactions.

Preferably, the space velocity can be varied by of the exhaust gas by varying an air intake flow into the engine. There exist a number of possible measures to vary the air intake flow, which can be applied individually or in appropriate combinations of at least two such measures:

It is possible to vary the air intake flow by varying an intake pressure by at least one of adjusting a turbine geometry of a variable turbine in the air intake flow, adjusting a throttle in the air intake flow. If a higher pressure is applied, more exhaust gas is produced.

Alternatively or additionally, the air intake flow can be varied by varying one or more intake valves of the engine. Closing an intake valve, when its piston is near the top, results in less air compared to closing the valve when its piston is near the bottom. Alternatively or additionally the air intake flow can be varied by varying an amount of exhaust gas in an exhaust gas recirculation. An increase of the amount of recirculated exhaust gas results in less fresh air in the exhaust.

Near maximum load conditions of the engine there is only a minimum room for varying the intake air flow since a maximum air flow is needed to give a good combustion of the fuel which is fed into the engine. On the other hand the temperature is typically high enough so that NO2 and NO will reach equilibrium in the oxidation catalyst regardless of the space velocity of the exhaust gas. At conditions with lower load of the engine there is more room for changing the intake air flow with a satisfying good combustion. A variation of the air intake flow can change the NOx and soot content and the temperature in the exhaust gas as well as the fuel consumption of the engine. NOx and soot variations can be easily adjusted to appropriate levels with regard if the SCR catalyst and a particulate filter by changing the timing of the injection of fuel into the engine. Further it is preferred to keep fuel consumption and total emissions on a satisfying level when the air intake flow is altered by adjusting appropriate engine parameters such as timing of fuel injection and/or pressure of the fuel injector.

Favourably, the desired ratio among the one or more constituents is a ratio of NO2/NO close to 1 and preferably not exceeding 1, particularly a ratio of NO2/NO=0.8±0.2, preferably NO2/NO=0.9±0.1, most preferably NO2/

NO=0.951±0.05. By choosing a ratio close to 1 it is possible to trigger a fast and highly efficient chemical reaction which reduces NO as well as NO2 and NH3 to N2 gas and water in the presence of the SCR catalyst. This reaction is favourable for a wide range of exhaust gas temperatures from below 200° C. and above. Other chemical reactions are possible depending on the amount of NO2 and NO, i.e. ratio of NO2/NO, present in the SCR catalyst. These reactions, however, are typically slower and prone to competitive reactions producing N2O and the like. Favourably, the efficiency of the selective catalytic reduction of the constituents of the exhaust gas can be optimized while at the same time good operating conditions can be provided for a particulate filter arranged upstream of the SCR catalyst. Preferably the particulate filter is arranged between the oxidation catalyst and the SCR catalyst. Alternatively or additionally, the oxidation catalyst can be at least partially be integrated in the particulate filter as an oxidation catalyst coating. The operating region where the exhaust aftertreatment system operates well can be enlarged compared to the prior art system which operates well only close to a few operating points of the engine. The method allows for an efficient exhaust aftertreatment with respect to cost, packaging and durability.

Additionally, the space velocity can be varied by controlling the flow of the exhaust gas through the oxidation catalyst which can be done by using an external bypass and/or an internal bypass inside the oxidation catalyst which allows to varying the flow distribution to the catalyst. The flow distribution may be varied by e.g. covering parts of the catalyst thus blocking catalyst against the exhaust gas, using flow guides for directing the exhaust gas and/or by opening valves that cover inlet and/or outlet ports in the oxidation catalyst. This may also be combined with a non-uniform distribution of the catalytically active material over the catalyst for further increasing the effect. Generally, an external bypass can be provided combined with the possibility to vary the space velocity of the exhaust gas flow.

Preferably, the ratio among the one or more constituents is established depending on the amount of soot which is contained in a particulate filter arranged upstream of the selective-catalytic-reduction catalyst.

According to a preferred development, the ratio among the constituents can additionally or alternatively be established depending on the amount of soot which is contained in a particulate filter arranged between the oxidation catalyst and the SCR catalyst. NO2 which is generated in the oxidation catalyst oxidizes soot trapped in the particulate filter. The amount of NO2 needed varies with the amount of soot in the particulate filter. Advantageously, the ratio among the members of the constituents can be established depending on the amount of NO2 which is generated in the particulate filter. The particulate filter can comprise an oxidation catalyst and thus produce NO2 which adds to the NO2 generated in the oxidation catalyst.

According to a preferred further development, additionally or alternatively the ratio among the constituents is established depending on the amount of NO2 which is generated in the oxidation catalyst and/or over the catalytic coating of the particulate filter. The oxidation catalyst can generate NO2 for both the passive oxidation of soot in the particulate filter as well as for the selective catalytic reduction in the SCR catalyst. The NO2 generated in the particulate filter is reacting back to NO on the soot so that the amount of NO2 and NO formed in the particulate filter is strongly dependent on the condition of the particulate filter, e.g. the amount of soot and on the reaction temperature, i.e. the exhaust temperature, wherein the selected specific chemical reaction has a higher probability to be performed than each single one of the other chemical reactions.

The ratio among the constituents can additionally or alternatively be established depending on the amount of sulphur which is adsorbed in the oxidation catalyst and/or on a oxidation catalytic coating of the particulate filter. The oxidation catalyst absorbs sulphur at lower exhaust gas temperatures and releases the sulphur at temperatures above 350° C. If operating conditions of the engine let the oxidation catalyst adsorb a lot of sulphur contained in the exhaust gas, the NO2 formation in the oxidation catalyst will be poisoned.

Favourably additionally or alternatively, the ratio among the constituents can be established depending on the amount of ammonia which is provided in the SCR catalyst. On an SCR catalyst ammonia is reacting with NOx to form nitrogen. On vehicles urea is injected into the exhaust gas and by the exhaust temperature urea is thermolyzed and/or hydrolyzed to ammonia in the exhaust gas and on the catalyst.

According to a further aspect of the invention, an exhaust aftertreatment system comprising at least an oxidation catalyst and a selective-catalytic-reduction catalyst arranged in an exhaust line of an engine, which is operated with a method as described previously, wherein at least one desired ratio among one or more pairs of the one or more constituents is adjustable by varying a space velocity of the exhaust gas in at least the oxidation catalyst; the space velocity of the exhaust gas is variable by varying one or more operation parameters of the engine; and the ratio can be established to a value at least approaching the desired ratio among the one or more pairs of the one or more constituents at the inlet of the selective-catalytic-reduction catalyst.

The space velocity of the exhaust gas in the oxidation catalyst and/or the portion of exhaust gas which can be fed into the bypass line and the portion of exhaust gas which can be fed into the oxidation catalyst can be controlled depending on operating parameters of the engine and/or on operating parameters of one or more catalysts arranged in the exhaust aftertreatment system. Consequently, a NOx or NO2 sensor can be replaced by a virtual sensor which uses a model of the engine and the exhaust aftertreatment system to calculate the relevant parameters, particularly the NO2 and NO content in the exhaust gas at the inlet of the SCR catalyst. Preferably parameters are available such as exhaust gas flow, temperatures in the oxidation catalyst and particulate filter, NO and NO2 flow from the engine, soot flow from the engine and/or soot load in the particulate filter. Some of the parameters can be measured and other parameters can be calculated from other sensors and engine parameters.

Preferably a particulate filter can be arranged upstream of the selective-catalytic-reduction catalyst. Particularly, the particulate filter can be arranged downstream of the oxidation catalyst and/or can comprise an oxidation catalyst coating.

According to a further aspect of the invention, a computer program storable on a computer readable medium is proposed, comprising a program code for use in a method comprising at least the steps of adjusting at least one desired ratio among one or more pairs of one or more constituents by varying a space velocity of exhaust gas in at least an oxidation catalyst stage; varying the space velocity of the exhaust gas by varying one or more operation parameters of an engine; and establishing the ratio to a value at least approaching the desired ratio among the one or more pairs of the one or more constituents at an inlet of a selective-catalytic-reduction catalyst.

BRIEF DESCRIPTION OF THE DRAWINGS

The present invention may best be understood from the following detailed description of the embodiments, but not restricted to the embodiments, wherein is shown schematically.

Figure 1:
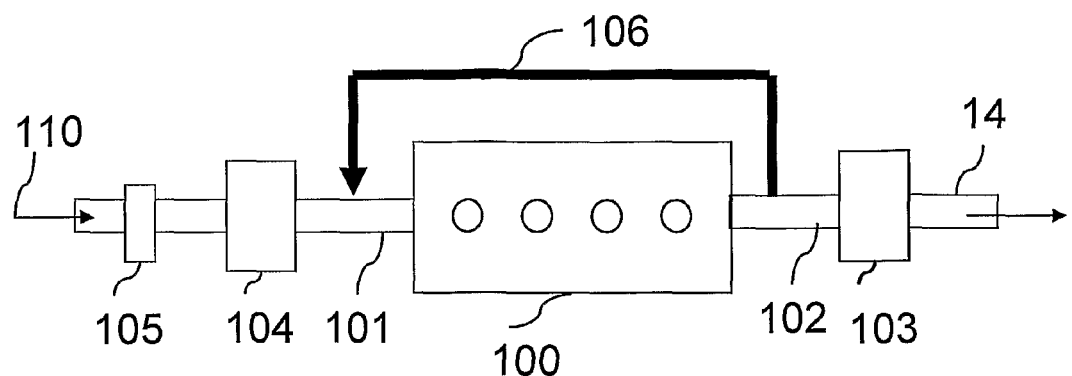
FIG. 1 a preferred engine comprising an exhaust gas recirculation.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

FIG. 1 depicts schematically a preferred diesel engine 100 with an exhaust line 14 for discharging combustion products of the engine 100 and an intake air flow 110 in an air supply 101 for oxidizing diesel fuel. A pressure stage 104, such as a compressor, for pressurizing the intake air is arranged upstream of the engine 100. A throttle 105 can be arranged upstream the pressure stage 104 to enable pressure below atmosphere in the intake air manifold 101. An exhaust gas recirculation 106 is provided for introducing exhaust gas into the intake air downstream of the pressure stage 104. The air is let in to the engine cylinders through intake valves (not shown) and mixed with fuel and combusted. The exhaust is passed through the outlet valves (not shown) to the exhaust manifold 102. From the exhaust manifold 102 a part of the exhaust is recirculated via a exhaust gas recirculation 106, to intake manifold 101. Some of the exhaust energy can typically be utilised in a turbine 103, particularly one with variable-turbine geometry. The turbine 103 is usually mechanically connected to the pressure stage 104. Changing the turbine geometry is resulting in a change of the pressure in the intake manifold 102. The intake valves and outlet valves in the engine 100 normally have fixed opening and closing times (in relation to the pistons movements) but can be arranged to have flexible e.g. closing times allowing for adjusting the amount of air into the cylinders. Usually, these features are used to allow that enough air comes to combustion process and also allow for different kinds of combustion conditions (e.g. rich combustion, HCCI (homogeneous charge compression ignition) etc).

By variation of the intake air flow 110 the space velocity of the exhaust gas discharged into the exhaust line 14 can be changed. A catalytic reaction taking place between constituents of the exhaust gas and a catalyst depends on the space velocity of the exhaust gas in the catalyst. Thus, the constituents of the exhaust gas leaving a catalyst after the catalytic reaction vary if the intake air flow 110 is varied.

Figure 2:
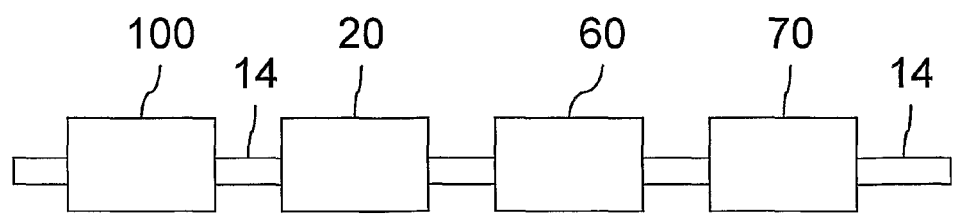
FIG. 2 a schematic representation of a preferred exhaust gas aftertreatment system according to the invention.

The schematic sketch of a preferred exhaust gas aftertreatment system 10 is illustrated in FIG. 2 wherein in the exhaust line 14 downstream of the engine 100 an oxidation catalyst 20, a particulate filter 60 and an SCR catalyst 70 are arranged.

The oxidation catalyst 20 can be typically coated with a catalytically active material and is provided to oxidize one or more constituents of the exhaust gas such as hydrocarbons (HC), carbon monoxide (CO), and nitrogen monoxide (NO). The efficiency of the oxidation depends on the reaction temperature, i.e. the exhaust temperature, space velocity of the exhaust gas flow in the oxidation catalyst 20 and the exhaust gas composition. The temperature in the exhaust line 14, i.e. in the oxidation catalyst 20, particulate filter 60 and the SCR catalyst 70, can be controlled with measures (not shown) known in the art, such as HC injection into the exhaust gas, late post-injections in the engine 100, providing a catalytic or flame burner and the like, for e.g. providing regeneration of the particulate filter 60, controlling the activity of the oxidation catalyst 20 and achieving favourable temperatures in the selective catalytic reduction in the SCR catalyst 70. Additionally, HC injection can be used to control the NO2 content in the exhaust aftertreatment system 10.

The oxidation catalyst 20 is preferably used to generate a sufficient amount of NO2 for passive oxidation of soot trapped in the particulate filter 60 according to the reaction

$$NO + \tfrac{1}{2}O_2 \rightarrow NO_2. \tag{R1}$$

The amount of NO2 in the exhaust gas can be influenced by varying the intake air flow 110. If the exhaust gas has a high space velocity, less NO2 is generated, if the exhaust gas has a low space velocity, more NO2 is generated.

The main function of the particulate filter 60 is to trap particulate matter such as soot and ashes contained in the exhaust gas. A typical vehicular exhaust aftertreatment system 10 requires one to several 100 000 km driving to fill the particulate filter 60 with ashes, and the particulate filter 60 can be emptied from ash by demounting the particulate filter 60 at service. To fill the particulate filter 60 with soot requires only one to several 1000 km driving. However, the soot can be burnt to CO2 which can be done during operation of the vehicle.

For some applications it may be beneficial to coat the particulate filter 60 with a catalytically active material including the properties of an oxidation catalyst into the particulate filter 60. For proper function of the particulate filter 60 it is recommended to control the amount of soot trapped in the particulate filter 60. Regeneration of the particulate filter 60 may be accomplished in various ways known in the art. Preferably, NO2 can be used for passive oxidation of the trapped soot according to the reaction is

$$2NO_2 + C \rightarrow 2NO + CO_2. \tag{R2}$$

For an efficient passive regeneration it is necessary to establish the exhaust gas temperature above a critical limit, preferably above 250° C., and to provide an adequate amount of NO2. The amount of NO2 in the exhaust gas fed into the particulate filter 60 can be increased by the oxidation catalyst 20 by oxidation of NO to NO2.

Depending on the engine 100 emissions of soot and NOx (NOx=NO, NO2), the passive burning of soot can keep the soot level in the particulate filter 60 low at exhaust temperatures above 250° C. For some engine emissions however, the ratio of NOx/soot is too low for burning the soot by NO2. Alternative to passive burning of soot the soot can be removed by burning it by oxygen at high temperatures, preferably at about 600° C. This can be achieved by either providing a burner in the exhaust aftertreatment system 10 or by adding fuel to the exhaust gas which is burnt on an oxidation catalyst upstream of the particulate filter 60. Activation of the burner or adding fuel is done in a regeneration phase which typically is in the range of a few minutes and which, however, can last as long as 30 min or even more, if necessary.

Downstream of the particulate filter 60 and upstream of the SCR catalyst 70 the exhaust gas contains one or more constituents as NO and NO2, which can be deoxidized in the SCR catalyst 70.

The main task of the SCR catalyst 70 is to reduce NOx, i.e. NO and NO2, with a reductant to nitrogen gas N2 and water H2O. On the SCR catalyst 70 ammonia NH3 reacts with NOx to form nitrogen. Usually, on vehicles urea is injected into the exhaust gas, and by the exhaust gas temperature urea is thermolyzed or hydrolyzed into NH3 in the exhaust gas and the catalyst 70. The reductant, e.g. NH3 or urea, is added to the exhaust gas upstream of the SCR catalyst 70, for instance by an injector 62 (indicated by a broad arrow upstream of the SCR catalyst 70). The efficiency of the SCR catalyst 70 is strongly dependent on the exhaust gas temperature, the space velocity of the exhaust gas and the NO2/NO ratio in the exhaust gas which enters the SCR catalyst 70.

Depending on the kind of NOx there are three principal chemical reactions possible:

$$4NO+4NH_3+O_2 \rightarrow 4N_2+6H_2O \tag{R3}$$

$$NO+NO_2+2NH_3 \rightarrow 2N_2+3H_2O \tag{R4}$$

$$6NO_2+8NH_3 \rightarrow 7N_2+12H_2O \tag{R5}$$

The reaction (R4), i.e. the exhaust gas contains NO2 and NO in equal or at least nearly equal amounts, has the highest efficiency and is efficient from exhaust temperatures below 200° C. and above. Reaction (R3), i.e. NOx in the exhaust gas comprises or consists mainly of NO, becomes efficient at 300° C. and for reaction (R5), i.e. NOx in the exhaust gas comprises or consists mainly of NO2, the efficiency is lower than for reaction (R3) on vanadium based SCR-catalyst while it is on zeolite-based catalyst more efficient than reaction (R3) but not as efficient as reaction (R4). Further, on zeolite-based catalysts an unfavourable competitive reaction to reaction (R5) exists which is generating the greenhouse gas N2O:

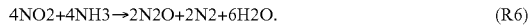

$$4NO_2+4NH_3 \rightarrow 2N_2O+2N_2+6H_2O. \tag{R6}$$

Hence, for high efficiency a NO2/NOX ratio of 0.5 (i.e. NO2/NO ratio of 1) into the SCR catalyst 70 is advantageous, whereas a higher ratio of NO2/NO should be avoided due to the lowest efficiency on vanadium catalyst or to avoid N2O formation if a zeolite is used. Further, the passive regeneration of the particulate filter 60 benefits from a high NO2 concentration. Therefore, the ideal NO2/NO ratio is 1, so a ratio at least close to 1 is favourable and preferably not exceeding 1, i.e. particularly a ratio is chosen of NO2/NO=0.8±0.2, preferably NO2/NO=0.9±0.1, most preferably NO2/NO=0.95±0.05. If the NO2/NO ratio is close to 1, then reaction (b) has the highest probability to be performed.

Figure 4:
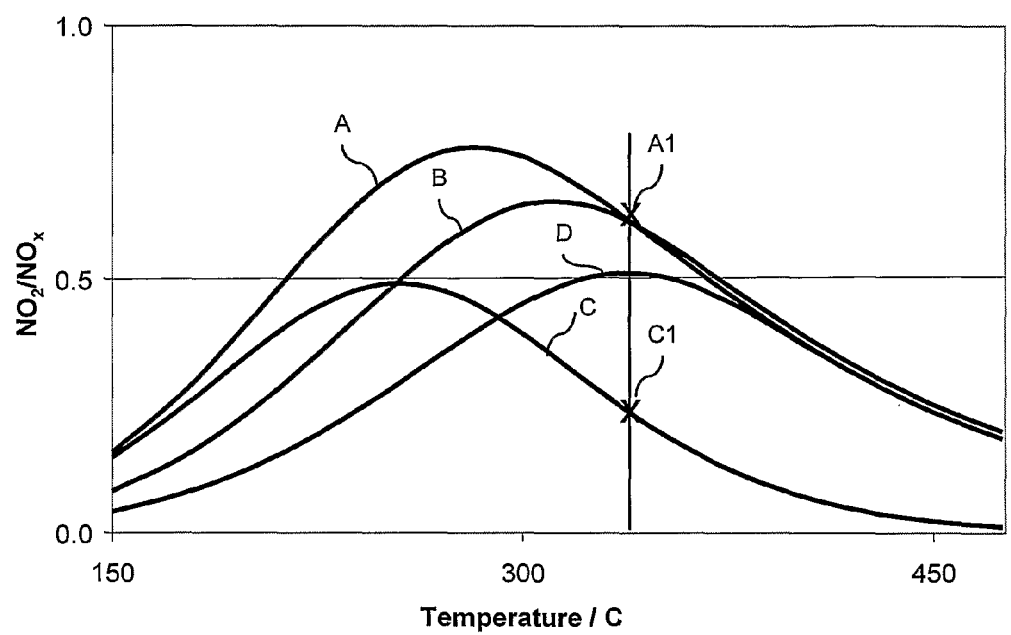
FIG. 4 temperature dependent ratios of NO2/NOx after a DPF unit with different soot load and sulphur load.

As can be seen in FIG. 4 the NO2 formation will depend on the exhaust gas mass flow, which can be influenced by the air intake flow 110, and the temperature of the oxidation catalyst 20. FIG. 4 illustrates the NO2/NOX ratio as a function of the reaction temperature in the oxidation catalyst 20 downstream of the oxidation catalyst 20 and the particulate filter 60. Besides the flow and temperature dependency, the oxidation catalyst 20 adsorbs sulphur, which can be contained in the exhaust gas, at lower temperatures and releases the sulphur at temperatures above 350° C. If driving conditions let the oxidation catalyst 20 adsorb a lot of sulphur, the NO2 formation wNI be poisoned. The NO2 content after the particulate filter 60 will also depend on the condition of the particulate filter 60. The particulate filter 60 can have an oxidation catalyst coated so that there is a NO2 formation there too. Then NO2 is reacting back to NO on the soot and that will depend on the amount of soot in the particulate filter 60 and on temperature.

Particularly, curve A illustrates the temperature dependence of the NO2/NOX ratio with a low soot load in the particulate filter 60, indicating a maximum of about 0.75 at between 250° C. and 300° C. Curve B represents a high exhaust flow and low soot load indicating a lower maximum of about 0.6 at a higher temperature of about 300° C. than curve A. Curve C represents a high soot load in the particulate filter 60, indicating a even more lowered maximum close to 0.5 at a lower temperature of about 250° C. compared with curves A and B and curve D represents a low soot load and sulphur poisoning of the oxidation catalyst 20, indicating a low maximum at about 0.5 at a higher temperature between 300° C. and 400° C. compared with curves A, B and C.

When the engine 100 is started, there is no soot load at the beginning and consequently there is no soot burnt in the particulate filter 60. However, soot is emitted by the engine 100 and a soot filter cake starts to build up in the particulate filter 60. The filter cake of soot is built up to a thickness which corresponds to an equilibrium where the rate at which soot is collected is equal to the rate of soot reacting with NO2. At higher loads, with typically higher exhaust temperatures, this reaction goes faster which means that the amount of soot in the particulate filter 60 is smaller than at lower loads. The time to reach equilibrium is in the range of minutes to hours. For instance, going from a low load, e.g. an hour city driving, to a high load means that the filter cake is much thicker in the beginning of the high load phase than after half an hour driving.

Favourably, the preferred control method can inherently consider the soot load in the particulate filter 60 as well as the sulphur load in the oxidation catalyst 20.

Preferably, it is tried to keep the NO2/NO ratio at a predetermined desired value for varying load conditions of the engine 100 if possible. When it is not possible to establish the specific ratio, it is tried to adjust the actual ratio towards the desired value. This can preferably be done by adjusting the intake air flow 110 in order to vary the space velocity of the exhaust gas appropriately.

Preferably the ratio is chosen close to 1 and preferably not exceeding 1, e.g. NO2/NO=0.8±0.2, preferably NO2/NO=0.9±0.1, most preferably NO2/NO=0.95±0.05.

Besides the variation of the space velocity by varying the intake air flow the adjustment of the NO2/NO ratio in the exhaust gas can be also be done by controlling the flow through the oxidation catalyst 20.

Figure 3:
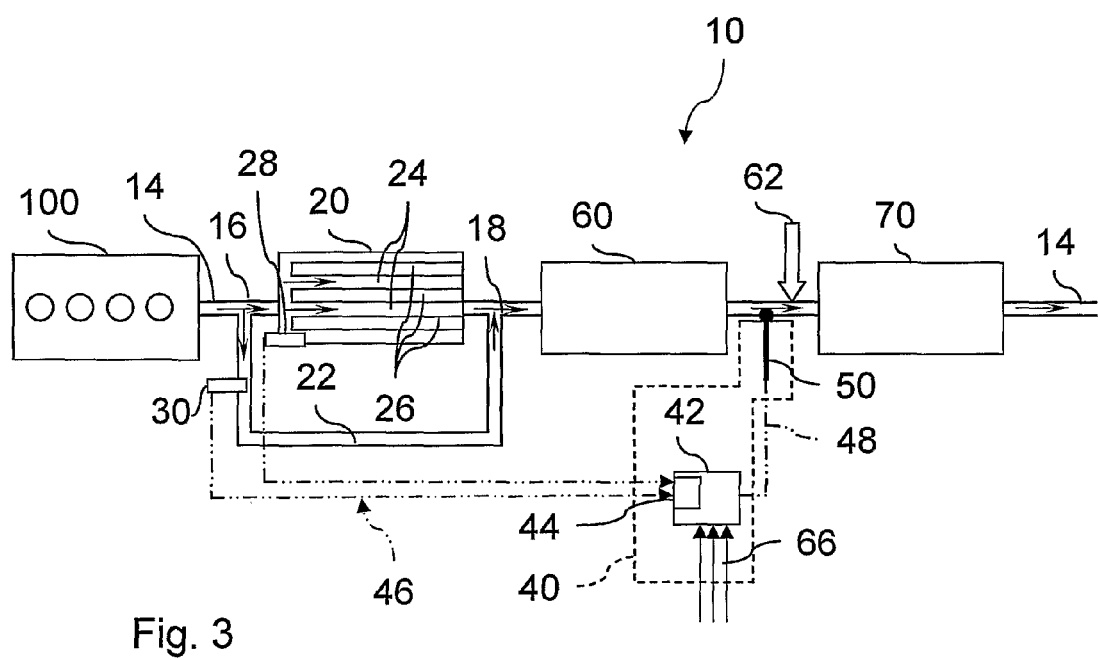
FIG. 3 a preferred embodiment of an exhaust gas aftertreatment system.

This is exemplified in FIG. 3. The oxidation catalyst 20 can optionally comprise an external bypass line 22 so that exhaust gas can by pass the oxidation catalyst 20, which can be controlled by a valve 30. Alternatively or additionally, the oxidation catalyst 20 can optionally comprise an internal bypass indicated by channels 24 and 26 which can be opened or closed by a closing unit 28.

The exhaust gas flow through the oxidation catalyst 20 is controlled in a way, particularly with the help of a NO2 sensor, to let enough exhaust flow through the bypass line 22 so that the ratio NO2/NOX does not exceed 0.5 (i.e. ratio NO2/NO does not exceed 1) before entering the SCR catalyst 70. In this way the passive soot oxidation (C+2NO2→CO2+2NO) can be achieved as well as the fastest and most selective SCR reaction (2NH3+NO+NO2→2N2+3H2O) is maximised and the slower and non-selective reactions (e.g. 3NO2+4NH3) are minimised which will minimise the emissions of NO2 and N2O. Preferably the wanted ratio NO2/NO not exceeding 1 is established so that the probability for the selected chemical reaction (R4) to be performed surmounts the probability to be performed for each single one of the other chemical reactions. As this reaction has also a high efficiency, a NO2/NO ratio close to 1 will automatically trigger this reaction at a high rate.

The control can be favourably achieved with the help of a NO2 sensor 50 placed downstream of the particulate filter 60. Optionally, the sensor 50 can be placed downstream of the SCR catalyst 70 thus providing a slower response. The NO2 sensor 50 can be replaced by a virtual sensor which calculates the NO2 content from available parameters such as exhaust flow, temperatures in oxidation catalyst 20 and particulate filter 60, NO and NO2 flow from engine 100, soot flow from engine 100 and soot load in particulate filter 60. Some of the parameters can be measured and some calculated from other sensors and engine parameters.

The preferred method can change the flow through the oxidation catalyst dependent on the NO2 and NOx sensor signals with e.g. a standard PID control (PID=Proportional-Integral-Derivative). An open loop control can be used by constructing a 4-dimensional map based on exhaust gas mass flow, temperature in oxidation catalyst 20, sulphur content in the oxidation catalyst 20 and soot load in the particulate filter 60 as input parameters. The 4-dimensional map can be constructed based on such curves as shown in FIG. 4 for example. However, the two parameters soot load and sulphur content for a sensor 50 should be calculated in a similar way as for the virtual sensor.

A virtual NOx sensor is a rather complex model and comprises or consists preferably of following sub-models which are given in quotes:

"Engine-out NOx": The amount of NOx at the outlet of the engine can be estimated by a sensor or a model with following inputs for example: load or fuel amount, timing for fuel injection, engine speed, intake air pressure, intake air temperature, EGR (EGR=exhaust gas recycling) amount and intake air humidity. These are parameters of the engine and sensed values. There are several ways to build the model. It can be map-based where all or at least some of the relevant parameters are, or can be, corrected by correction factors laid down in the map. It can also be a model built on a neural network as base.

"Exhaust gas flow": The exhaust gas flow can be measured, or derived from the measured air intake flow and the fuel amount, or from the calculated air intake flow from engine speed, intake air pressure, intake air temperature, EGR amount and volumetric efficiency of the engine.

"Exhaust gas flow in oxidation catalyst": The exhaust gas flow in the oxidation catalyst 20 can be measured or calculated from the valve opening.

"Temperature in catalyst": The temperature can e.g. be measured upstream of the oxidation catalyst 20. By applying an appropriate signal filter the measured value together with the exhaust gas flow into the oxidation catalyst 20 as a parameter can represent the actual catalyst temperature. Alternatively the temperature can be calculated by using a simple heat balance.

"Sulphur in oxidation catalyst": The sulphur content in the oxidation catalyst 20 is preferably calculated. For instance the calculation can be derived from the parameters in parentheses: (sulphur content in catalyst)=(sulphur content in catalyst a second before)+(sulphur adsorbed from exhaust during a second)−(sulphur desorbed during a second). The parameter "sulphur adsorbed from exhaust during a second" is the sulphur content in the fuel and lubrication oil consumed during the said second multiplied with a factor, wherein the factor is between 0 and 1 and has a temperature dependency which can e.g. be derived from a map containing temperature dependent values of the factor. The parameter "sulphur desorbed during a second" is the sulphur content in the oxidation catalyst 20 one second before multiplied with another temperature dependent factor which can be derived in the same way as the first factor described above.

"NO2 formation in catalyst": The NO2 formation in the oxidation catalyst 20 can be derived from interpolating in a 3-D based on the parameters exhaust gas flow, temperature in catalyst and sulphur content. It can also be calculated using a physical model with sulphur content, temperature, exhaust gas flow and oxygen concentration as input parameters. The model can be e.g. a specific NO2 formation rate which is $k1 \cdot C_{NO} \cdot C_{O2}$ and an NO2 decomposition rate which is $k2 \cdot C_{NO2}$, where k1 and k2 are temperature dependent and sulphur-content dependent parameters and C is the concentration of NO, NO2 and O2, respectively. The specific rate is integrated over the catalyst volume. If there is a wide range of the HC content in the engine's working area or if an HC-injector is used, then the HC level is also an input parameter to the model, e.g. as a denominator for the specific rates $(1+Ka \cdot C_{HC})$. Ka is a (temperature dependent) equilibrium constant.

"NO2 out from the particulate filter": The amount NO2 which is released from the particulate filter 60 is the difference between the amount of NO2 fed into the particulate filter 60, NO2 formed in the particulate filter 60 (which is zero if no catalytic layer is provided in the particulate filter 60 for NO2 generation) and NO2 consumed by soot in the particulate filter 60. NO2 formed in the particulate filter 60 can be calculated in the same manner as the NO2 formed in the oxidation catalyst 20 (see above), preferably a physical model. NO2 consumed by soot in the particulate filter 60 is proportional to the amount of soot in the particulate filter 60 and can be expressed as a specific rate $k3 \cdot C_{NO2} \cdot C_{Soot}$—Again, k3 is a temperature dependent parameter and C the respective concentration of NO2 and soot.

"Soot load in particulate filter": The soot load in particulate filter 60 can be derived from a measured pressure drop over the particulate filter 60 and/or by applying a model: (soot in the particulate filter 60 at a current time)=(soot in the particulate filter 60 at a time before the current time)+(soot emitted by the engine during the current time)−(soot burnt by NO2 during the current time). Soot burnt by NO2 during the current time is given by the "NO2 out from particulate filter" model, soot emitted by the engine during the current time is given from a soot sensor or a similar model as the "Engine-out NOx" model. The usage of a pressure drop for calculation of a soot amount in the particulate filter 60 can introduce some errors due to the fact that the soot characteristic is changing with time. Therefore it is preferred to use a model for calculating the soot load and use the pressure drop as a qualitative check of the model.

By controlling the flow of the exhaust gas through the oxidation catalyst 20 depending on the desired ratio among the constituents, particularly the ratio NO2/NO, and by establishing the ratio among the constituents so that at a given reaction temperature in the SCR catalyst 70 one specific chemical reaction, particularly reaction (R4) is selected out of a group of possible chemical reactions (R3), (R4), (R5), which can take place among the constituents of the exhaust gas and the catalyst material in the SCR catalyst 70, an efficient removal of NO, NO2 and—at the same time—of soot is achieved.

Referring now particularly to FIG. 3 the variation of the space velocity of the exhaust gas by adjusting the intake air flow in a preferred embodiment according to the invention a first flow control device is provided in order to control the exhaust flow through the oxidation catalyst 20. By this it is possible to influence the NO2/NO ratio further.

The flow control device is designed as a controllable valve 30 which controls the exhaust gas flow by dividing it into a first portion entering the oxidation catalyst 20 and a second portion entering into a bypass line 22. Both flow portions are mixed again upstream of the particulate filter 60. The bypass line 22 is provided external to the oxidation catalyst 20 through which exhaust gas can circumvent the oxidation catalyst 20. The bypass line 22 starts at a first branching point 16 upstream of the oxidation catalyst 20 and ends at a second branching point 18 downstream of the oxidation catalyst 20.

The flow of the exhaust gas through the oxidation catalyst 20 is controllable depending on a desired ratio among members of the constituents of the exhaust gas, particularly between NO2 and NO. A predetermined ratio of NO2/NO can be maintained over the operation variations of the engine 100. Additionally, according to another favourable embodiment (not shown) an oxidation catalyst can be provided in the by-pass line 22, thus allowing to further varying the space velocity of the arrangement.

Referring now back to FIG. 4, by way of example point A1 of curve A indicates a stationary condition at a high engine load with a low soot load in the particulate filter 60 at about 350° C. Having a thick filter cake corresponds to point C1 at curve C. A control method based only on temperature does not take into account the big difference in the available NO2 amount. The bypass line 22 would be opened to reduce the NO2 content with approximately VA of the exhaust gas bypassed within one minute according to a typical time scale for the temperature variation of the oxidation catalyst 20. However, during this one minute the soot load in the particulate filter 60 has not changed much so that the NO2/NO ratio would be much lower than the preferred ratio. Considering the influence of the sulphur poisoning of the oxidation catalyst 20 (curve D), if the control method would only take into account the temperature, the amount of NO2 would be so low that under equilibrium conditions a filter cake thickness could built up which could become critical for the particulate filter 60. Favourably, the preferred control method inherently can take into account the time scale for the change of the soot load in the particulate filter 60 as well as the influence of sulphur in the oxidation catalyst 20.

Between the particulate filter 60 and the SCR catalyst 70 a sensing unit 40 is provided for sensing the amount of NO2 contained in the exhaust entering the SCR catalyst 70. The sensing unit 40 comprises a NO2-sensitive sensor 50 arranged in the exhaust line 14 downstream of the particulate filter 60 and a control unit 42 connected to the sensor 50 and the valve 30 via data lines 48 and 46 respectively. Optionally a device 44 can be coupled to the control unit 42 to calculate the amount of NO2 entering the SCR catalyst 70 depending on parameters 66, such as operating parameters of the engine 100 and/or on operating parameters of one or more catalysts 20, 60, 70 arranged in the exhaust aftertreatment system 10, as described above.

Alternatively or additionally valve 30 can be replaced by units controlling the space velocity of the exhaust gas in the oxidation catalyst 20, such as the closing unit 28 coupled to the oxidation catalyst 20. By way of example the oxidation catalyst 20 can be formed as a monolith of a honeycomb type comprising a multitude of the channels 24, 26 through which the exhaust flows from the catalyst inlet to the catalyst outlet. The closing unit 28 can close or open channels 26 in the oxidation catalyst 20 when switched between its particular operation positions. The total number of the channels 24, 26 available for the exhaust gas in the oxidation catalyst 20 can be varied with the help of the closing unit 28. If the channels 26 are closed by the closing unit 28 in a first operation position, the exhaust gas flow is forced through channels 24, thus decreasing the available catalyst volume for the exhaust gas. In this case, only a little amount of NO2 is produced. If the closing unit 28 is switched to another operating position channels 24 as well as channels 26 are open. The exhaust gas can flow through all channels 24 and 26, providing more catalyst material for oxidizing the exhaust gas and yielding an increased NO2 output.

Additionally or alternatively, the effective cross section of the individual channels 24, 26 can be varied with the help of a preferred closing unit 28 (not shown). Additionally (not shown), the channels 24 and 26 can exhibit e.g. different diameters and/or be furnished with different catalytic material and/or equipped with different densities of the catalytic material. It is also possible to provide a density gradient of the catalytic material in the channels 24 and/or channels 26. The density gradient can be oriented at a right angle to the exhaust gas flow from one side of the oxidation catalyst 20 to the other. If a closing unit 28 covers a part of the channels 24 and/or 26 of the oxidation catalyst 20 and the cover is removed the change in catalytic reactivity is stronger than the increase or decrease in channel volume.

Another embodiment (not shown) of a preferred closing 28 is to provide a movable plate of the kind of a camera lens diaphragm which varies the surface of the catalyst 20 exposed to the exhaust gas.

Another embodiment (not shown) of a preferred oxidation catalyst 20 is to provide an inlet design which distributes the exhaust gas to the whole area at high exhaust gas velocities and concentrates it to the centre at low velocities.

The closing unit 28 and/or the valve 30 are coupled to a sensing unit 40 which is provided for sensing the amount of NO2 contained in the exhaust entering the SCR catalyst 70 and receive control signals from the control unit 42 of the sensing unit 40 via data lines 46. The NO2-sensitive sensor 50 arranged in the exhaust line 14 downstream of the particulate filter 60 is coupled to the control unit 42 via data line 48. The closing unit 28 can be combined with and/or formed as flow guides in the oxidation catalyst 20.

Optionally, the sensing unit 40 can comprise a device 44 which calculates the amount of NO2 entering the SCR catalyst 70 depending on operating parameters of the engine 100 and/or on operating parameters of one or more catalysts 20, 60, 70 arranged in the exhaust aftertreatment system 10 thus forming a virtual NO2-sensor.

Particularly, the virtual sensor can be part of a computer program comprising a software code adapted to perform a preferred control method or for use in a control method according to at least one of the features described above when said program is run on a programmable microcomputer and can particularly be downloaded to a support unit or one of its components when run on a computer which is connected to the internet.

The preferred control methods well as the exemplified preferred exhaust aftertreatment systems allow to control and particularly minimize the emissions of NO2 and N2O as well as soot within a wide load-speed work area of an engine with a good soot combustion by NO2 without the necessity to add additional fuel into the exhaust aftertreatment systems for reducing emissions.

Generally, the invention described above allows for operating the exhaust gas aftertreatment system under real time conditions. According to a favourable embodiment, FIG. 3 illustrates a combination of the first embodiment of varying the intake air flow 110 alone and the second embodiment of controlling the NO2/NO ratio by an external and/or internal bypass of the oxidation catalyst 20. in order to control the generation of a certain NO2/NO gas mixture required as input for the subsequent SCR catalyst 70. In order to optimize the real time control of the NO2/NO ratio it is also possible to couple a buffer to the bypass line 22. Particular situations or engine modes of operation can occur where certain amounts of the produced exhaust gas cannot be processed in a good way according to the invention because the gas volume is too large and/or the composition of the gas mixture is too unbalanced. In such situations it can be favourable to store certain amounts of the exhaust gas in a controlled way in an intermediate buffer connected or connectable to the exhaust gas system 10 upstream and/or downstream the catalyst 20. This buffer could or should be used in an active way by either taking away excess exhaust gas volumes from or to shoot in missing exhaust gas volumes into the exhaust gas system in order to optimize the mixture of compounds needed to stabilize the wanted ratio of NO2/NO gas mixture over a longer period of time. This buffer could be a fixed buffer where the exhaust gas is usually stored under pressure that is larger than the operating (average) pressure within the exhaust gas system (perhaps a pump is needed to put exhaust gas in into, and a valve is needed to let gas out of the buffer. Alternatively, a buffer with flexible walls (like a balloon) could be used.

The invention claimed is:

1. An exhaust aftertreatment system comprising
an oxidation catalyst,
a selective-catalytic-reduction catalyst arranged in an exhaust line of an engine,
a particulate filter arranged upstream of the selective catalytic-reduction catalyst,
an engine and intake air flow arrangement operable to adjust at least one desired ratio among one or more pairs of the one or more constituents by varying a space velocity of the exhaust gas in at least the oxidation catalyst by varying one or more operation parameters of the engine;
means for establishing the ratio to a value at least approaching the desired ratio among the one or more pairs of the one or more constituents at the inlet of the selective-catalytic-reduction catalyst depending on a non-zero amount of NO2 which is generated or consumed in the particulate filter; and
a control unit configured to operate the engine and intake air flow arrangement to adjust the desired ration and to control the establishing means to establish the desired ratio at the inlet of the selective-catalytic-reduction catalyst.

2. The exhaust system according to claim 1, wherein the particulate filter is arranged downstream of the oxidation catalyst and/or comprises an oxidation catalyst coating.

3. The exhaust system according to claim 1, wherein the establishing means comprises at least one of a closing unit for restricting flow through the oxidation catalyst and a bypass arrangement for bypassing the oxidation catalyst.

4. A method for operating an exhaust aftertreatment system of an engine in which one or more constituents of exhaust gas from the engine are oxidized in an oxidation catalyst and one or more constituents of the exhaust gas are deoxidized by means of a group of possible chemical reactions of different types between the one or more constituents of the exhaust gas and catalytic material arranged in a selective-catalytic-reduction catalyst, wherein the exhaust gas flows from the oxidation catalyst to the selective-catalytic-reduction catalyst, comprising (a) adjusting at least one desired ratio among one or more pairs of the one or more constituents by varying a space velocity of the exhaust gas in at least the oxidation catalyst;
(b) varying the space velocity of the exhaust gas by varying one or more operation parameters of the engine; and
(c) establishing the ratio to a value at least approaching the desired ratio among the one or more pairs of the one or more constituents at the inlet of the selective-catalytic-reduction catalyst, wherein the ration among the one or more constituents is established depending on an amount of NO2 which is generated or consumed in a particulate filter downstream of or comprising the oxidation catalyst.

5. The method according to claim 4, comprising varying the space velocity by of the exhaust gas by varying an air intake flow into the engine.

6. The method according to claim 5, comprising varying the air intake flow by varying an intake pressure by at least one of adjusting a turbine geometry of a variable turbine in the air intake flow, and adjusting a throttle in the air intake flow.

7. The method according to claim 5, comprising varying the air intake flow by varying the opening and closing of one or more intake valves of the engine.

8. The method according to claim 4, comprising varying the air intake flow by varying an amount of exhaust gas in an exhaust gas recirculation.

9. The method according to claim 4, wherein the desired ratio among the one or more constituents is a ratio of NO2/NO close to 1.

10. The method according to claim 4, wherein the ratio among the one or more constituents is established depending on the amount of soot which is contained in the particulate filter arranged upstream of the selective-catalytic-reduction catalyst.

11. The method according to claim 4, wherein the ratio among the one or more constituents is established depending on the amount of NO2 which is generated in the oxidation catalyst.

12. The method according to claim 4, wherein the ratio among the one or more constituents is established depending on the amount of sulphur which is adsorbed in the oxidation catalyst.

13. The method according to claim 4, wherein the ratio among the one or more constituents is established depending on the amount of ammonia which is provided in the selective-catalytic reduction catalyst.

14. A non-transitory computer readable medium comprising a computer program for performing a method according to claim 4.

15. The method according to claim 4, comprising establishing the ratio among the one or more constituents by controlling flow of the exhaust gas through the oxidation catalyst.

16. The method according to claim 15, comprising controlling flow of the exhaust gas through the oxidation catalyst by at least one of restricting flow through the oxidation catalyst and bypassing the oxidation catalyst.

17. The method according to claim 4, wherein the ratio among the one or more constituents is established depending on a non-zero amount of NO2 which is generated or consumed in the particulate filter.

* * * * *